United States Patent [19]

King

[11] 4,120,765

[45] Oct. 17, 1978

[54] METHOD AND APPARATUS FOR PRODUCING FOAM

[76] Inventor: Arthur Shelley King, 8021 Cherokee La., Leawood, Kans. 66206

[21] Appl. No.: 807,051

[22] Filed: Jun. 16, 1977

[51] Int. Cl.² .............................................. C02C 5/12
[52] U.S. Cl. ................................... 204/149; 204/152; 210/13; 210/14
[58] Field of Search ............... 204/151, 149, 152, 130, 204/129, 108; 210/13, 14

[56] References Cited

U.S. PATENT DOCUMENTS

| | | | |
|---|---|---|---|
| 1,069,169 | 8/1913 | Parker | 210/13 X |
| 1,344,127 | 6/1920 | Greenwalt | 204/108 |
| 2,997,430 | 8/1961 | Föyn | 204/151 |
| 3,944,478 | 3/1976 | Kuji et al. | 204/149 X |

*Primary Examiner*—Arthur C. Prescott
*Attorney, Agent, or Firm*—Schmidt, Johnson, Hovey & Williams

[57] ABSTRACT

Foam is produced electrolytically in a liquid having foaming tendencies through the use of closely spaced electrodes of opposite polarity that are disposed in substantially upright dispositions within the body of liquid being treated. The electrodes extend from a position deep within the body to a point at or above the surface of the body, and the electrodes are so formed or are associated with such other structure that bubbles generated within the columnar treating region between the electrodes cannot escape from the electrodes until reaching the surface of the liquid, thereby being confined and exposed to the electrodes throughout the full extent of travel by the bubbles to the surface. By regulating the position of the bubble outlet relative to the surface of the liquid, the characteristics of the foam produced from the bubble discharge may be varied, e.g., locating the point of bubble discharge a very slight distance above the surface of the liquid produces a creamy, relatively viscous foam having small diameter bubbles compared to the foam produced with the discharge at a more elevated position in which instance bubbles of larger diameter appear in the foam.

7 Claims, 10 Drawing Figures

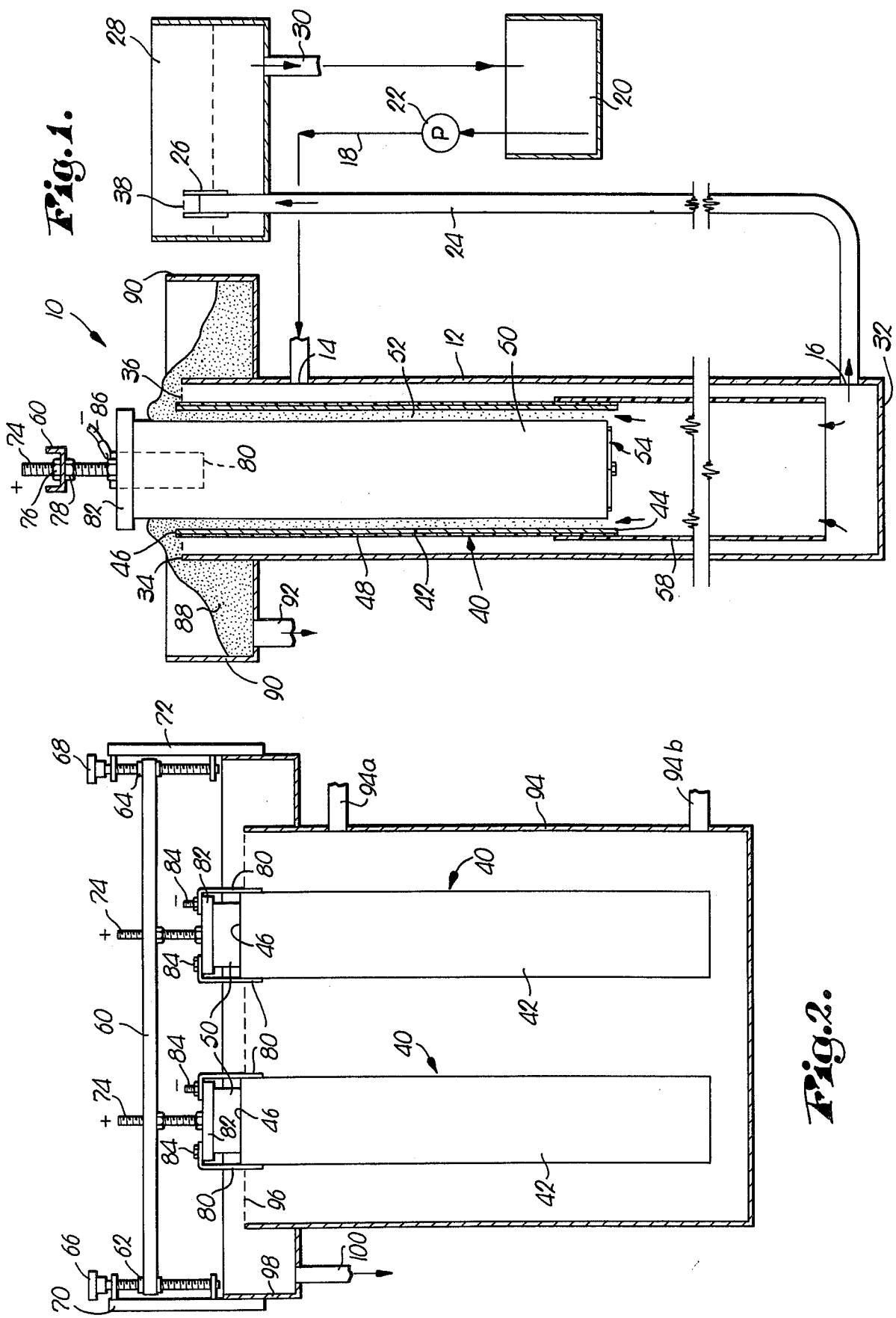

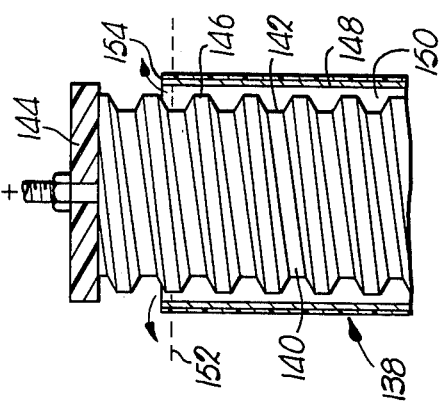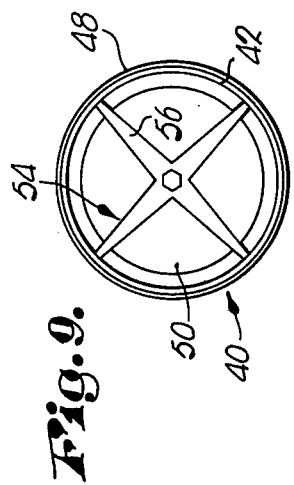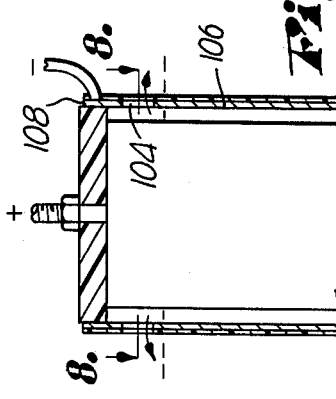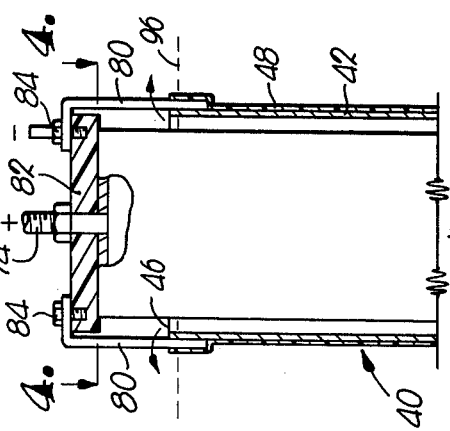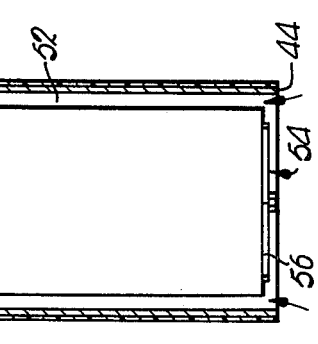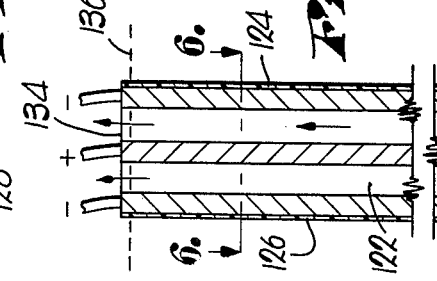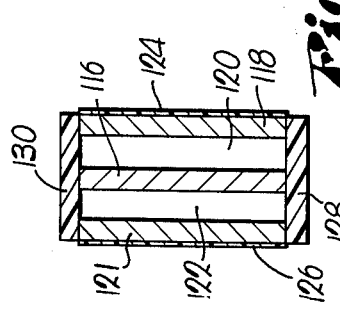

METHOD AND APPARATUS FOR PRODUCING FOAM

This invention relates to the production of foam by electrolysis and, more particularly, to improvements in the nature of the foam that is generated.

It is known that the pollutant load of waste water can be substantially reduced using a technique that causes bubbles to be generated within the water so that each bubble becomes a carrier for conveying pollutants to the surface where a foam is formed that can then be skimmed off or otherwise removed from the liquid. Each bubble provides a new liquid-gas interface at which the pollutant particles can be concentrated. It has been found in the wood pulp industry, for example, that the organic pollutants found in the effluent will readily attach to bubbles that are generated and will rise to the surface to form a foam or scum that can then be removed and reclaimed. Surface active agents or "surfactants" can either be utilized as catalysts to boost the foaming action, or, in many instances, it can be the end goal of the treatment to remove such surfactants themselves which may have resisted traditional sewage treatment techniques and passed through a municipality's sewage treating system virtually intact.

The principles of the present invention are directed toward the nature or character of the foam that is produced, and in certain respects, also, to the way in which such characteristics can be selectively varied to accommodate any particular conditions at hand. Thus, the present invention, while being applicable to countless situations where the removal of pollutants from waste water is desired, is not directed to the specific end uses as such, but rather to the technique of producing the foam itself.

In the description and claims which follow the principles of the present invention will be set forth in connection with liquid having what will hereinafter be referred to as "foaming tendencies" or, in other words, will be "foamable." As is well-known in the art, there are many countless liquids which exhibit this quality as a result of the pollutant load which they carry or otherwise, and it is to be understood that the principles of this invention are not in any way limited to a specific type of such liquid. As above-mentioned, waste water with organic pollutants of various kinds will react in the desired manner to the generation of bubbles therewithin, as will surfactant-laden waste water.

One object, then, of the present invention is to provide improvements in the way in which foam is produced electrolytically in foamable liquids.

Another important object of this invention is to provide improvements in the "quality" or characteristics of the foam that is produced so that it can be readily removed from above the body of liquid from which it is produced without collapsing into liquid form and, hence, returning to the body of liquid from which it was derived.

An additional important object of this invention is to provide a way of controlling the characteristics of the foam that is produced.

Another important object of the invention is to provide a variety of exemplary forms in which the apparatus principles of the present invention may be embodied, all of which are capable of carrying out the unique method priciples of the invention.

In the drawings:

FIG. 1 is a vertical cross-sectional view of apparatus constructed in accordance with principles of the present invention;

FIG. 2 is a vertical cross-sectional view of a second form of apparatus capable of carrying out the principles of the present invention;

FIG. 3 is a vertical cross-sectional view of a foam-generating unit utilized in the apparatus of FIGS. 1 and 2;

FIG. 4 is a cross-sectional view thereof taken along line 4—4 of FIG. 3;

FIG. 5 is a vertical cross-sectional view of another form of foam generator usable with the apparatus of FIGS. 1 and 2;

FIG. 6 is a cross-sectional view thereof taken along line 6—6 of FIG. 5;

FIG. 7 is a vertical cross-sectional view of a slightly modified form of foam-generating unit usable with the apparatus of FIGS. 1 and 2;

FIG. 8 is a cross-sectional view thereof taken along line 8—8 of FIG. 7;

FIG. 9 is a bottom view of the generating unit of FIG. 1 illustrating the manner in which the inner electrode thereof is maintained in spaced relationship to the outer electrode thereof; and FIG. 10 is a fragmentary, vertical cross-sectional view of yet another embodiment of foam-generating unit illustrating helical guide channels between the two electrodes of the unit.

The apparatus 10 illustrated in FIG. 1 includes an upright tank 12 having an inlet 14 adjacent the upper end thereof and an outlet 16 adjacent the bottom thereof. The inlet 14 is connected through a line 18 to a reservoir 20 that supplies liquid to be treated to the tank 12 via the line 18 under the action of a pump 22. On the other hand, the outlet 16 ultimately communicates with the reservoir 20 through a standpipe 24 having an uppermost discharge end 26 that overflows into a receptable 28 having a drain 30 to the reservoir 20. Thus, a recirculating system is established wherein liquid leaves the reservoir 20, passes through the tank 12 and ultimately returns to the reservoir 20 after completing its journey through the tank 12.

The tank 12 has a closed bottom 32 but an open top 34, and it is intended that the level of the liquid within the tank 12 never exceed the uppermost marginal edge of the top 34. In this respect, the level of liquid, or the upper surface thereof as it will hereinafter be described, is indicated in the tank 12 by the numeral 36 and may be controlled by making the discharge end 26 on the standpipe 24 vertically adjustable. In this manner, since the surface 36 of the liquid in the tank 12 must be at the same height as the surface 38 of the liquid within standpipe 24, by raising or lowering the end 26, the surface 36 will follow along accordingly. As will hereinafter become apparent, such regulation of the position of the surface 36 within the tank 12 is significant with respect to foam control and production.

A foam-generating unit broadly denoted by the numeral 40 is situated within the tank 12 in upright disposition as is clearly shown. The unit 40 consists primarily of two electrodes that expose the liquid within the tank 12 to electrolysis and thereby generate bubbles which ultimately produce foam on the surface 36 of the liquid. One of the electrodes may be termed the "outer" electrode and is designated by the numeral 42. The electrode 42 is tubular and is open at its two opposite ends 44 and 46, respectively. A thin jacket 48 of dielectric material, such as merely a thin paint film, may preferably be applied to the outside of the electrode 42 in order to minimize any electrical current flow between the outside of electrode 42 and adjacent conductive structures such as the tank 12. Preferably, electrode 42 is constructed from carbonaceous material.

The inner electrode is designated by the numeral 50 and preferably comprises a solid cylinder of carbonaceous material, the diameter of the electrode 50 being slightly less than the inside diameter of the outer electrode 42 so that although an annular space or region 52 is defined therebetween, such region 52 is relatively narrow compared to the overall dimensions of the generating unit 40. A spacer 54 at the bottom of the inner electrode 50 and having a four-pronged configuration as illustrated in FIG. 9 is of dielectric material and serves through its prongs 56 to engage the adjacent portion of the outer electrode 42 and thereby maintain proper spacing between the two electrodes 42, 50.

Although the foregoing describes the tank 12 only as structure for containing the liquid, it should be pointed out that tank 12 could be utilized as one electrode in lieu of the electrode 42. Satisfactory results can be achieved when that alternative construction is utilized, but adequate safety precautions must be taken to avoid human contact with tank 12.

A sleeve 58 of suitable dielectric material may be provided around the outer electrode 42 adjacent its lowermost end to serve as an extension of the latter downwardly to a position closely adjacent the bottom 32 of tank 12 in the event that the electrodes 42, 50 are not of sufficient lengths to approach that area. The extension sleeve 58 fits tightly about the electrode 42 and yet can be slid upwardly or downwardly along the latter to accommodate the dimensions of the tank within which it is used. The effect of the sleeve 58 is thus to extend the generator down to the lowermost levels of the tank 12, even though there is no electrolytic action at such lower levels in view of the lack of electrodes in that area. By having the sleeve 58 so provided, liquid will be drawn into the generator 40 just as if the outer electrode 42 were present in lieu of the sleeve 58, all in a manner yet to be explained in detail.

The generator 40 may be supported within the tank 12 by any number of suitable means, one of which is partly shown in FIG. 1 and perhaps more fully and clearly shown in FIG. 2 in connection with a second type of installation. With reference momentarily to FIG. 2, and with the understanding that the described arrangement also applies to FIG. 1, note that a crossbar 60 above the generator unit may be supported at its two opposite ends 62 and 64 by a pair of upright adjusting screws 66 and 68, respectively, the screws 66, 68 in turn being supported by a pair of structural uprights 70 and 72, respectively.

The opposite ends 62, 64 of the crossbar 60 are provided with suitable internally threaded means that matingly receive threads on the screws 66, 68 so that rotation of the latter in appropriate directions will cause the crossbar 60 to be raised or lowered.

A threaded rod 74 projects upwardly from its fixed attachment to the inner electrode 50 and extends through the crossbar 60, being attached to the latter by any suitable means, preferably including some type of dielectric materials (not shown) so that the crossbar 60 and the rod 74 are electrically insulated from one another. For purposes of example only, the rod 74 has in fact been illustrated in a threaded condition so as to cooperate with a pair of nuts 76 and 78, respectively, on opposite upper and lower sides of the crossbdar 60 to retain the rod 74 in a selected position of vertical adjustment relative to the crossbar 60. Thus, this also determines the vertical position of the inner electrode 50.

Also by way of example, the inner electrode 50 has a plurality of inversely L-shaped, electrically conductive straps 80 secured at one end to the dielectric cap 82 thereof and fixed at the opposite end to the outer periphery of the outer electrode 42. Dielectric material for cap 82 assures that the electrodes 42 and 50 are indeed electrically insulated from one another at that point, there being a fastener 84 in the form of either a nut and bolt or a cap screw that attaches the straps 80 to the cap 82. Such fastener also serves as a terminal for one conductor 86 (FIG. 1) that may be hooked to one side of a source of electrical potential (preferably the negative side), while the rod 74 serves as a second terminal, this time for a conductor (not shown) connected to the opposite side of the source of electrical potential (preferably the positive side thereof).

Thus, it should be apparent that the generator 40 is suspended within the tank 12 in this particular illustration of the invention, although it will, of course, be apparent that other means of mounting and supporting the generator 40 could well be utilized. Regardless of the particular mounting means selected for use, upon the introduction of foamable liquid into the region 52 between the electrodes 42 and 50, and upon the application of power to the generator 40, countless bubbles will be generated within the region 52 as a result of the electrolysis that occurs. Such bubbles are confined and channeled upwardly along the electrodes 42, 50, each presenting a liquid-gas interface upon which pollutants and surface active agents can adhere, so that the bubbles pour forth from the upper end 46 of the electrode 42 in the nature of a rich foam 88. The annular upper end 46 of the outer electrode 42, of course, serves as the foam outlet for the generator 40 during operation, and the foam 88 lies on top of the upper surface 36 of the body of liquid within the tank 12 until such time as the foam 88 becomes so excessive that it spills over into the overflow trough 90. A drain 92 may be used to carry away the foamate when the foam collapses or liquifies.

Although the liquid within the system is continuously circulating between the tank 12 and the reservoir 20, such liquid is also caused to circulate upwardly through the generating unit 40 in a natural pumping action caused at least in part by the rising stream of bubbles within the region 52. In other words, the rising bubble stream has the primary effect of carrying materials to the surface 36, but also has the secondary effect of drawing in additional liquid through the open bottom of the sleeve 58 (or the open lower end 44 of the outer electrode 42 if sleeve 58 is not present). This action continually reintroduces a fresh flow of liquid into the generating unit 40 so that the same portion of liquid is not always being treated.

It should also be pointed out that the pumping action within the generator 40 also appears to be caused in part by a thermal phenomenon. That is, it appears that heat is generated during the electrolytic action, and the heated liquid rises toward the surface with the bubbles that are generated, thereby contributing to the creation of the secondary stream flowing into the bottom of the generator.

It is important to emphasize that the quality of the foam that is produced depends directly on two different factors. A first factor seems to be that the electrodes 42 and 50 are disposed in an upright condition and are so configured that the bubbles are confined, channeled and otherwise restricted to continuous exposure to the electric field within the region 52 clear up to the surface 36 of the liquid within the tank 12. It seems that without this type of concentration, containment and continuous exposure of the bubbles to the electric field during such strict control that the quality of foam produced is simply not of the same order as when these principles are followed strictly. The precise reasons for this phenomenon are not fully understood, but observations of various comparative arrangements in operation have seemed to bear out these conclusions.

A second factor in the quality of foam that is produced involves the position of the foam outlet (in this instance the annular upper end 46 of the outer electrode 42) with respect to the surface 36 of the body of liquid being treated. Although, again, the reasons behind this phenomenon are not fully understood, it has been observed that some of the most desirable results can be obtained when the foam outlet is only very slightly above the surface 36. Upon raising the generator 40 so as to elevate the outlet end 46 above the surface 36 from the point illustrated in FIG. 1, the foam will increase in bubble size so that it is more "airy." Such elevation of the generator 40 also seems to adversely affect the inherent pumping action that is achieved, i.e., makes it more difficult to pump by natural action, and thus the overall operation of the generator is adversely affected.

Parenthetically, it should be noted that the position of the generator 40 relative to the surface 36 can be controlled not only by bodily raising or lowering the generator 40 through suitable adjustment means such as the screws 66 and 68, but also the surface 36 itself can be repositioned relative to the fixed-position generator 40 by adjusting the discharge end 26 of the standpipe 24 so that the surface 36 will rise or fall an appropriate amount. Either of these two means could be utilized, singly or in combination, to adjust the relative position of the surface 36 and the foam outlet (the upper end 46 of the inner electrode 42).

The arrangement illustrated in FIG. 2 is quite similar to that of FIG. 1, although there is no recirculation to and from an outside reservoir as in the system of FIG. 1. Rather, the liquid is intended to be treated on a "batch" basis and is simply contained within a large container 94 which may be of such a size as to advantageously make use of several generating units 40, there being two of such units 40 illustrated in FIG. 2 for exemplary reasons. Inlet 94a and outlet 94b on the container 94 may be used to supply and drain each batch of liquid to and from container 94, respectively. The principles involved are precisely the same as with the apparatus and system of FIG. 1, it being the intention only to illustrate a slightly different utilization of the generating units 40. Note in particular that the units 40 are still upright and that the upper edge 46 of the outer electrode 42 is slightly above the surface 96 of the body of liquid within the container 94. The overflow trough 98 with drain 100 is comparable to the trough 88 with its drain 92 of FIG. 1, although it might be worthy of note here that the trough 88 could be partitioned so that only part of the foam would be disposed of by drain 100 while another part would be reintroduced (by means not shown) into container 94 near the bottom thereof to augment the generation of additional foam.

FIGS. 3 and 4 simply illustrate the generator 40 as it might be found in any large receptacle, such as the container 94, as contrasted to its use within the tank 12. The construction of the generator 40 is precisely the same as that illustrated in FIGS. 1 and 2, and one reason for its showing is for comparative purposes with the generating unit 102 illustrated in FIGS. 7 and 8. The unit 102 is substantially identical to the unit 40, with the exception that the foam outlet configuration differs. While in the unit 40 the foam outlet is defined by the upper annular end 46 of the outer electrode 42, in the unit 102 such outlet is defined by a plurality of circular apertures 104 in the outer electrode 106 adjacent the upper end 108 of the latter. The configuration of the inner electrode 110 remains the same as that of the inner electrode 50 of FIGS. 14, as does the configuration of the treating region 112. In all other respects as well, the unit 102 is essentially similar to the unit 40.

The unit 102 has been illustrated to emphasize that it appears to make no difference as to what form the foam outlet takes. For example, it may be essentially continuous as in FIGS. 14, interrupted only by the straps 80, or it may be of a more restricted and intermittent nature as illustrated by the unit 102.

The arrangement illustrated in FIGS. 5 and 6 is intended to show that the particular shape of the electrodes chosen for use is of no particular consequence, provided that certain principles are adhered to. For example, the generating unit 114 of FIGS. 5 and 6 utilizes electrode plates rather than electrode tubes or cylinders as in the previously described arrangements. As illustrated, the unit 114 includes one electrode plate 116 that may be, for example, connected to the positive side of a source of electrical potential, and a second electrode plate 118 that is spaced from the plate 116 to define a treating region 120. The second electrode plate 118 may be connected to the negative side of a source of electrical potential and, if desired, a third electrode plate 121 (connected to the negative side of the source) may be utilized on the opposite side of the first plate 116, spaced a distance therefrom equal to the width of the region 120, and thus defining an equivalently dimensioned treating region 122. The outer respective surfaces of the electrodes 118 and 121 may be covered with a suitable dielectric material, such being illustrated by the numerals 124 and 126, respectively.

The electrodes 116, 118, and 121 are maintained in their separated condition by opposite, dielectric end spacers 128 and 130 that serve also to help confine and channelize the bubbles that are created within the regions 120 and 122 during operation. The spacers 128 and 130 extend the full height of the unit 114 and entirely close off the interior of the latter except for its open bottom 132 and its open top 134. Thus, bubbles generated during operation of the unit 114 have absolutely no recourse but to migrate upwardly toward the open top 134 (which serves as the foam outlet of the unit 114), whereupon they spread out onto the surface 136 of the liquid body in the form of foam.

In principle, the unit 140 is precisely the same as that previously described. The channelizing and confining of the bubbles is believed quite important to the successful operation of the unit 114 and the proper formation of foam in the most efficient manner. Furthermore, the relative positioning of the foam outlet (open top 134) relative to the surface 136 is important with respect to the quality of foam that will be produced, just like in the earlier arrangements.

It is considered important that in any of the generators illustrated herein that the oppositely charged electrodes thereof be situated quite closely together. As would be expected, the closer the two electrodes are to one another, the less resistance there is to electrical current flow between the same, and thus the more efficient the operation. However, such closeness of spacing also has a tendency to restrict the upward flow of bubbles and liquid being pumped, so the configuration of FIG. 10 is submitted as being one construction that will allow the electrodes to be quite closely spaced and yet provide a relief or release path to the surface of the liquid for the bubbles and liquid that are pumped through the generator.

The generator unit 138 in FIG. 10 has the inner electrode 140 thereof provided with a helical channel or passage 142 that winds about the periphery of electrode 140 and leads toward the upper end thereof. Likewise, the channel 142 presents an adjacent, continuous, helical ridge 146 that also leads toward the upper end 144, and such ridge 146 may be spaced but a very short distance from the adjacent inner surface of the outer electrode 148. Accordingly, the treating region 150 between the inner and outer electrodes 140, 148 is defined in its narrowest respects by the distance between the ridges 146 and the outer electrode 148 and in its widest respects by the distance between the root of the channels 142 and the outer electrode 148.

As before, the outer electrode 148 is preferably connected to the negative side of a source of electrical potential while the inner electrode 140 is connected to the positive side thereof. The generating action is precisely the same as in the previous embodiments, except for the fact that as the generated bubbles migrate upwardly toward the surface 152 of the liquid and flow over the upper annular edge 154 of the outer electrode 148, they tend to follow the helical route provided by the channel 142 and swirl upwardly around the electrode 140. This has the additional benefit of retaining the bubbles for a greater period of time within the electric field between the electrodes 140, 148, hence augmenting the charge that they may have received during initial generation.

EXAMPLES

In one test equipment was set up similar to that illustrated in FIG. 2 using a large container filled with approximately 200 gallons of waste water from a truck washing facility. The pollutant load of the waste water included a detergent in a concentration of something less than 10% of the total volume of liquid. Carbon electrodes were utilized, both extending down to a point closely adjacent the floor of the tank, and a potential of 6 volts was applied with a current of from 10 to 20 AMPS, the two electrodes being spaced apart not more than approximately 1 inch.

The result was an immediate generation of foam and a very noticeable pumping action, the flow including not only foam issuing through the top outlet of the generator but also liquid itself pouring forth. The foam spilled over onto the surface of the liquid and showed little tendency to break up. It seemed to have a somewhat creamy texture and would adhere readily to a small blade inserted into the foam and then withdrawn upwardly above the surface thereof in order to test its ability to cling together.

The outlet for the foam was initially disposed only fractions of an inch above the upper surface of the liquid within the tank. Later, the generator unit was elevated so that the foam outlet would be disposed several times higher above the surface than was true in the initial test. This resulted in the continued generation of foam, but the foam took on a different character. In this second test the foam seemed to consist of much larger bubbles that would not adhere to the test blade to the same extent as those in the foam from the first test. The foam appeared to be more "airy" than the previous foam and did not have the "creamy" texture of the first foam.

Returning the generator back down to the initial level resulted in a return of foam having the initial characteristics of the first test.

A second analysis of the foam-producing qualities of the present invention involved placing approximately one pint of whole milk in a 5 gallon container of tap water. A small generating unit of a size that would fit into the relatively small container was constructed along the same lines as the generator 40 in the drawings. An electrical potential of 6 volts was applied at approximately 10 AMPS, and the result was the prompt generation of a creamy foam on the surface of the water, apparently consisting of the milk that had been previously mixed into the water. The outlet for the foam from the generator in this run was situated only fractions of an inch above the surface of the water. Carbon electrodes were utilized.

Having thus described the invention, what is claimed as new and desired to be secured by Letters Patent is:

1. In a method of producing foam by exposing a body of foamable liquid to electrolytic action from a pair of oppositely charged electrodes, the improvement comprising:
   arranging the electrodes in an upright disposition and in adjacently opposed relationship;
   placing the upright electrodes within the body of liquid so that both electrodes are substantially surrounded by the liquid;
   circulating liquid upwardly between the electrodes from the body of liquid surrounding the electrodes; and
   preventing bubbles generated by the electrodes during such circulation from escaping the electrodes at least until a point adjacent the upper surface of the body is reached.

2. In a method as claimed in claim 1, wherein the bubbles are prevented from escaping from the electrodes until slightly above said surface of the body.

3. In a method as claimed in claim 1, wherein said circulating step is carried out by using the upflow of bubbles to induce a secondary flow of liquid.

4. In a method as claimed in claim 1, wherein said preventing step is carried out by using the surfaces of the electrodes to confine the bubbles as they rise toward said surface.

5. In a method as claimed in claim 4, wherein said circulating step is carried out by using the upflow of bubbles to induce a secondary flow of liquid.

6. In a method as claimed in claim 5, wherein the bubbles are prevented from escaping from the electrodes until slightly above said surface of the body.

7. In a method as claimed in claim 1; and the additional step of selectively locating the point of escape of bubbles from the electrodes at any one of a number of available positions relative to the surface of the body in accordance with the desired size of bubbles to appear in the foam that is produced.

* * * * *